UNITED STATES PATENT OFFICE.

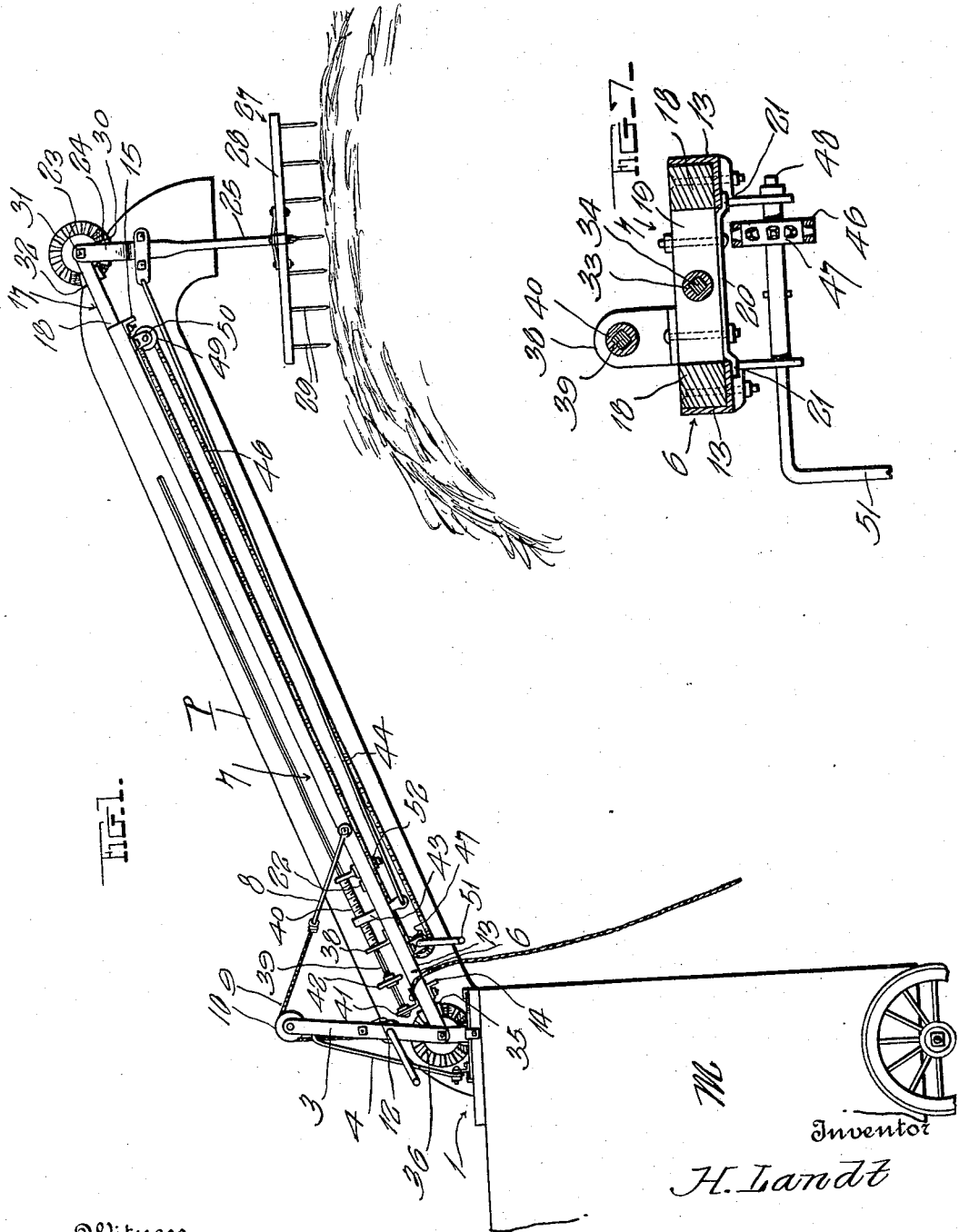

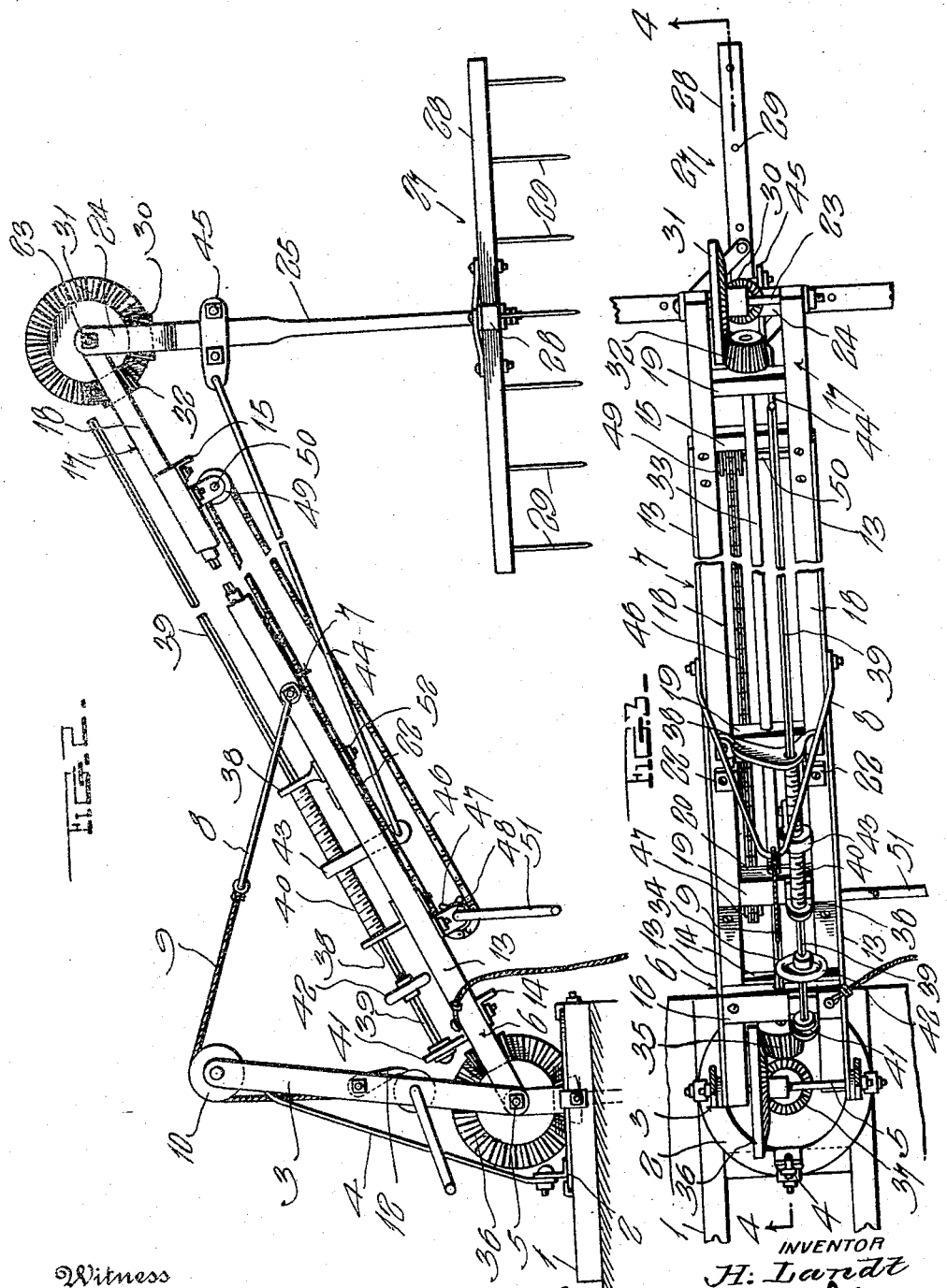

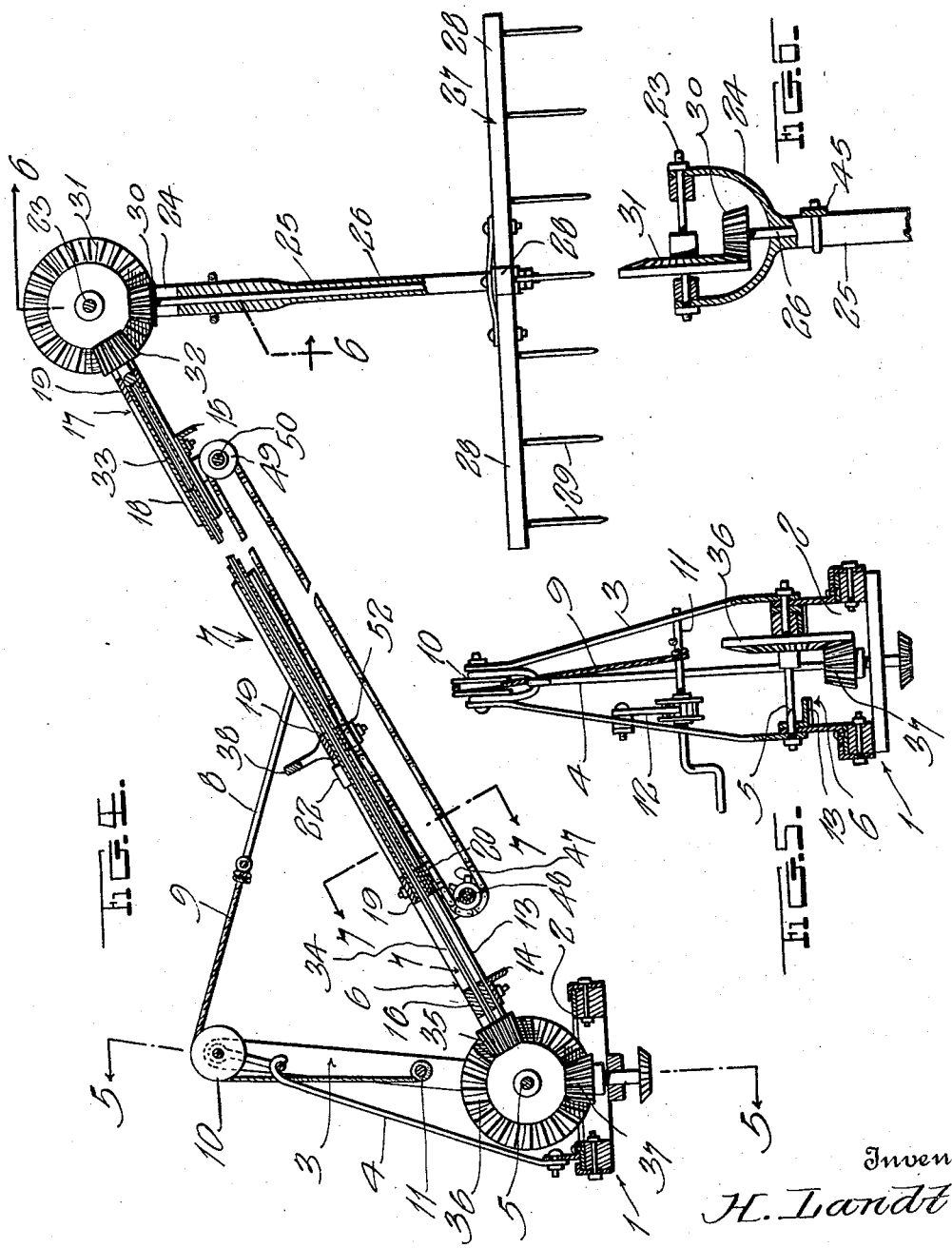

HUGO LANDT, OF PIPESTONE, MINNESOTA.

STRAW-STACKER.

1,208,988.

Specification of Letters Patent. Patented Dec. 19, 1916.

Application filed October 5, 1916. Serial No. 123,860.

*To all whom it may concern:*

Be it known that I, HUGO LANDT, a citizen of the United States, residing at Pipestone, in the county of Pipestone and State of Minnesota, have invented certain new and useful Improvements in Straw-Stackers; and I do declare the following to be a full, clear, and exact description of the invention, such as will enable others skilled in the art to which it appertains to make and use the same.

The present invention aims to provide a simple and inexpensive yet efficient and durable device for attachment to threshing machines for the purpose of spreading the straw discharged from the usual blower or other form of stacking conveyer employed.

With the foregoing general object in view, the invention resides in certain novel features of construction and in unique combinations of parts to be hereinafter fully described and claimed, the descriptive matter being supplemented by the accompanying drawings which constitute a part of this application and in which:

Figure 1 is a side elevation of the invention showing the application thereof to a threshing machine; Fig. 2 is an enlarged side elevation; Fig. 3 is a top plan view; Fig. 4 is a longitudinal section on the plane indicated by the line 4—4 of Fig. 3; and Figs. 5, 6, and 7 are vertical transverse sections on the planes of the lines 5—5, 6—6, and 7—7 respectively of Fig. 4.

In the drawings above briefly described, the numeral 1 designates a suitable frame or base to be bolted or otherwise secured to the top of a threshing machine to one side of the blower pipe P or other conveyer which is used for discharging the straw to the stack. A turntable 2 is mounted on the base 1 and carries an A frame 3 which is preferably braced at 4, a bolt or the like 5 extending between the lower ends of the legs of the frame 3 and serving as a pivotal mounting for the fixed inner section 6 of an extensible and contractible frame 7, said section 6 having a bail 8 to which a cable 9 is secured, said cable being trained over a sheave 10 at the upper end of the frame 3 and being wound on a windlass 11 carried by said frame. A suitable pawl and ratchet mechanism 12 is provided for holding the drum 11 in adjusted position and it will thus be evident that through the instrumentality of this drum and the cable 9, the entire frame 7 may be swung vertically.

The fixed inner section 6 of the frame 7 is constructed of two angle metal side bars 13 connected at their inner and outer ends by angle metal transverse bars 14 and 15, another transverse bar 16 of wood being preferably secured in place above the bar 14. The outer section 17 of the frame 7 slides within the angles of the side bars 13, said section comprising a pair of side bars 18 which are preferably of wood, and three or more transverse bars 19. A bar 20 is secured to the lower side of the lowermost bar 19 and its ends are directed downwardly and outwardly to form shoes 21 underlying the horizontal flanges of the side bars 13 to hold the two sections 6 and 17 in operative relation. Other guide shoes 22 (see Figs. 2 and 3) also assist in performing this function.

The upper end of the frame section 17 carries a transverse shaft 23 upon which the forked upper end 24 of a tubular arm 25 is mounted, said tubular arm receiving rotatably therein a vertical shaft 26 carrying a spreader 27 on its lower end, this spreader preferably consisting of crossed bars 28 having teeth 29. A pinion 30 on the upper end of shaft 26 meshes with a beveled gear 31 rotatably mounted on shaft 23, said gear being also in mesh with a pinion 32 on the outer end of a longitudinally disposed tubular shaft 33 which is carried rotatably by the section 17 of the frame 17.

A polysided shaft 34 telescopes with shaft 33 and is fixed relative to the frame section 6, the inner end of this shaft having a pinion 35 meshing with a beveled gear 36 rotatably mounted on the bolt or shaft 5. The gear 36 may be driven in any suitable manner, but a pinion 37 preferably meshes therewith as shown, this pinion being driven in any appropriate manner from a moving part of the threshing machine M.

Suitable bearings 38 rise from the inner end of the frame section 17 and rotatably support a polysided longitudinal shaft 39 upon which a tubular screw 40 is mounted slidably, said screw being held against endwise movement in respect to the bearings 38 by contact therewith as shown. A bearing 41 rotatably supports the inner end of shaft 39 and connects the same with the frame section 6, said end having a hand wheel or the like 42 by means of which the inner shaft 39 may be rotated to operate the screw 40. A nut 43 is mounted on said screw 40 and is connected by means of a rod 44 and clamp 45 to the tubular arm 25. It will thus be observed that as screw 40 is turned in one direction or the other, the nut 43 will be moved along the same and that this motion will be transmitted through the rod 44 to the arm 25 to swing the latter inwardly or outwardly according to the direction in which the straw is to be thrown.

A sprocket chain 46 passes around a sprocket 47 on a transverse shaft 48 and around a pulley 49 on another transverse shaft 50, both of these shafts being carried by the frame section 6. A crank or the like 51 is provided for rotating shaft 48 to drive the sprocket 47, and at 52 the chain 46 is secured to one of the bars 19 of the frame section 17, whereby the last named section may be shifted inwardly or outwardly at will during which movement the screw 40 will slide upon the shaft 39 and is always in readiness for further adjustment.

In use the frame 1 is secured to the top of a threshing machine to one side of the straw delivering conveyer thereof which may be in the form of a blow pipe P indicated in Fig. 1. The gear 36 is now driven, this gear transmitting power to the spreader 27 by means of the pinion 35, the shafts 34 and 33, the gearing 32, 31, 30, and shaft 26. The spreader or distributer 27 rotates in such a position as to permit it to receive the straw discharged from the stacking conveyer, and it therefore serves to throw this straw outwardly by centrifugal force, thus taking the place of the person or persons who usually stand upon the stack and distribute the straw with pitch forks. By swinging the entire device horizontally upon the turntable 2, it may be made to throw the hay to any location desired, and a further range of operation may be had by turning the hand wheel 42 to throw the arm 25 inwardly or outwardly to vary the angular relation of the distributer with respect to the stack. As the stack increases in height it is obvious that the entire frame 7 and parts carried thereby may be gradually raised by means of the windlass 11.

From the foregoing, it will be obvious that although the machine is of simple and inexpensive nature, it will be highly efficient and durable. For these reasons the construction shown and described constitutes the preferred form of the machine, but it is to be understood that within the scope of the invention as claimed, numerous changes may be made without sacrificing the principal advantages.

I claim:

1. A machine of the class described comprising a turntable, and A frame rising rigidly therefrom, a vertically moving elongated frame consisting of a relatively fixed inner section pivoted to the A frame and an outer section slidable on said inner section, means on said A frame for adjusting the other frame vertically, a rotary distributer carried by the outer end of the outer frame section, means for driving said distributer including a pair of telescoping shafts carried respectively by the inner and outer sections of said vertically movable frame, means for adjusting the outer frame section on the inner, and means for swinging the distributer longitudinally of said vertically movable frame.

2. A machine of the class described comprising an elongated frame, means for mounting one end of said frame to permit it to swing vertically and horizontally, an arm pendant from the other end of said frame, a rotary distributer carried by said arm, and means for swinging said arm longitudinally of the frame.

3. A machine of the class described comprising an elongated frame supported at one end, an arm pendant from the other end of said frame, a rotary distributer carried by said arm, and means for swinging said arm longitudinally of the frame.

4. A machine of the class described comprising an elongated frame consisting of an inner relatively fixed section and an outer section slidable thereon, an arm pendant from the outer end of the outer section, a rotary distributer carried by said arm, a rod pivoted to said arm, a nut to which said rod is connected, a tubular screw threaded through said nut and movable with the outer frame section, and a screw operating shaft mounted rotatably on the inner frame section and passing slidably but non-rotatably through said screw.

In testimony whereof I have hereunto set my hand in the presence of two subscribing witnesses.

HUGO LANDT.

Witnesses:
MORRIS EVANS.
IRENE FINNEGAN.

Copies of this patent may be obtained for five cents each, by addressing the "Commissioner of Patents Washington, D. C."